United States Patent [19]

Matsuda et al.

[11] 4,273,432

[45] Jun. 16, 1981

[54] MOTOR DRIVEN CAMERA

[75] Inventors: Mutsuhide Matsuda, Yokohama; Hideo Tamamura, Tokyo; Tetsuya Taguchi; Tadashi Okino, both of Kawasaki; Mutsunobu Yazaki, Yokohama, all of Japan

[73] Assignee: Canon Kabushiki Kaisha, Tokyo, Japan

[21] Appl. No.: 71,544

[22] Filed: Aug. 31, 1979

[30] Foreign Application Priority Data

Sep. 8, 1978 [JP] Japan .............................. 53-111068
Sep. 14, 1978 [JP] Japan .............................. 53-113049

[51] Int. Cl.³ ............................................. G03B 15/05
[52] U.S. Cl. .................................... 354/145; 354/173; 354/214
[58] Field of Search ......................... 354/145, 173, 214

[56] References Cited

U.S. PATENT DOCUMENTS 3,846,812  11/1974  Biber .............................. 354/173 X Primary Examiner—John Gonzales
Attorney, Agent, or Firm—Toren, McGeady and Stanger

[57] ABSTRACT

In a camera having an electric motor and a flash device incorporated within the housing thereof, in order that simultaneous electrical power supply to the motor and the flash device from one and the same battery never occurs, there are provided a switch cooperative with a shutter button upon depression to inhibit electrical power supply to the flash device, and another switch arranged to be closed when each cycle of film winding operation is completed, thereby the motor is disconnected from the battery and the flash device is connected thereto.

5 Claims, 5 Drawing Figures

MOTOR DRIVEN CAMERA

DETAILED DESCRIPTION

This invention relates to motor driven cameras, and more particularly to motor driven cameras having an automatic film transport system incorporated within the housing thereof.

It is known to provide a wide variety of cameras having incorporated therein an electric motor for automatically performing film winding and shutter cocking operations each time an exposure is completed. Since many of them make use of a battery incorporated in the camera housing as the electrical power source of energization of the motor, many problems arise. Of these, the most serious, arising from the spatial limitations of the camera, is the unavailability of a space large enough to accommodate a battery within the camera housing. Batteries of small power capacity cannot be used. As a result, it is often impossible to complete a predetermined number of film winding operations with a single battery. To accomplish all of the film winding operations, the operator is required to replace the battery frequently, and therefore will be subject to a high risk of losing a chance to obtain a desired exposure.

This problem is very objectionable when the same battery is used not only for operating the film transport system, but also for other purposes, for example, film rewinding. To effect film winding followed by rewinding, the motor usually uses as much electrical power as one watt or more, and therefore rapid consumption of the electrical energy in the battery results which will detract from the useful life of the battery.

Particularly in the case of a small size camera, because of its use of a lower power battery as has been mentioned above, this is a serious drawback. Again, besides the rewinding operation there is also encountered a similar situation where the same battery is utilized as the electrical power source for a flash device. Since it is usually in the order of 1 to 2 amperes for a few seconds that a storage capacitor of the flash device is charged with such a large current, all the energy in the battery is used up in a shorter time just by the repeated use of the flash device. With the motor driven camera of the type described, therefore, when equipped with a flash device which is also connected to a common battery for the film winding drive mechanism, the battery is no longer usable after a large current is discharged from it. Thus, such distribution of electrical energy from the battery cannot be entirely put into practice, so that it is impossible to realize automatic film rewinding operation with power being supplied from the same battery.

Recently, the battery art has achieved great advances and provides high performance batteries such as alkalimanganese, nickel-cadmium and the like, each capable of producing a very large current. The assurance of a large current flow over a long time period is nevertheless impossible, and normal operation of a motor driven camera cannot be maintained throughout a long time interval.

To eliminate such problems, according to the prior art, the power supply from the battery is controlled in a time-displaced manner such that after the charging of a storage capacitor has been completed, the film winding mechanism is actuated, whereby simultaneous drawing of large currents from the battery is prevented, (as disclosed in Japanese Open Patent Sho No. 50-97327, U.S. Pat. No. 3,846,812). This proposal gives rise to another disadvantage in that actuation of the electric motor is delayed by the time interval necessary to charge the storage capacitor, and since only after the film has been advanced one frame is the camera ready to make the next exposure, there is a very high possibility of missing desired film exposures. Another disadvantage is that since there is a high probability for the motor control circuit to respond to a noise signal from the DC-DC converter of the booster for the storage capacitor while charging, a very large current is caused to flow out from the battery by such operation with possible damage to the battery such as shortening of the life-time thereof. Still another disadvantage is that since the above-described operation is embodied in electronic circuitry such as a voltage detecting circuit, logic circuit and the like, it is not well suited for a general-purpose camera.

An object of the present invention is to eliminate all the above-described drawbacks of the conventional camera and to provide a motor driven camera featuring not only automatic film winding operation but also operations such as automatically rewinding the film and making flash exposure using one and the same battery with high reliability and with simple construction.

This and other objects and features of the present invention will become apparent from the following detailed description of preferred embodiments thereof taken in conjunction with the accompanying drawings.

Figure 1:
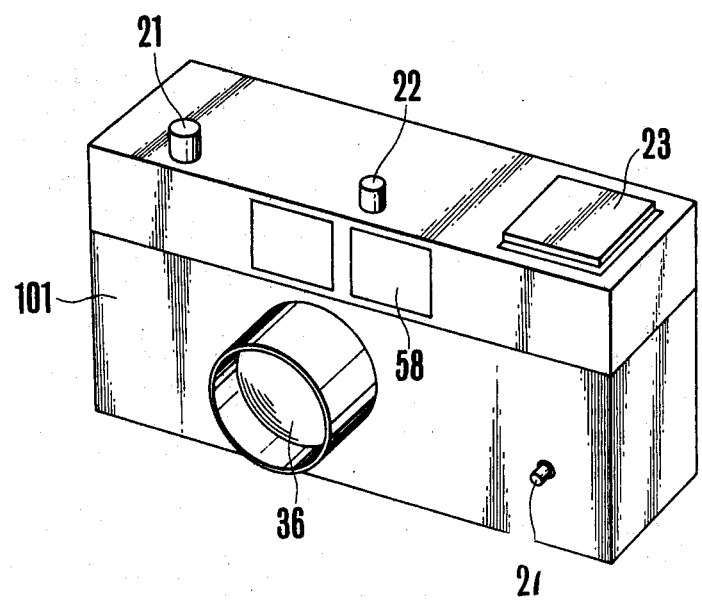
FIG. 1 is a perspective view of a motor driven camera to which the principles of the invention are applied.

FIG. 1 shows a flash camera 101; to which the present invention is applied; a release button 21 of the camera; a film rewinding actuator button 22; a flash device 23 entirely contained within the housing of the camera and arranged upon depression of a pop-up button 27 to project its flash lamp above the upper panel of the housing; an objective lens 36; and a finder 58.

Figure 2:
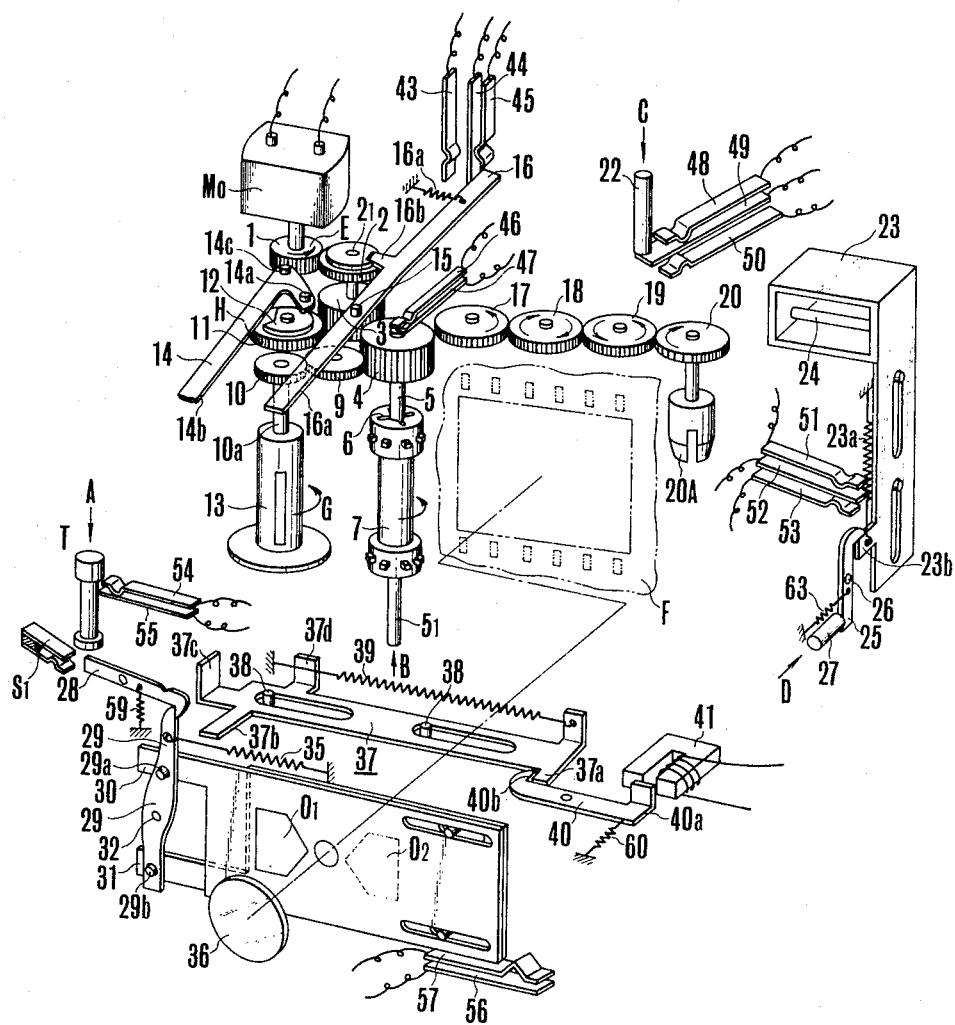
FIG. 2 is an exploded perspective view of the main parts of the camera of FIG. 1.

In FIG. 2, an electric motor Mo serves for winding and rewinding film and includes a speed reduction mechanism in the casing thereof. FIG. 2 further includes a gear affixed to the output shaft of the speed reduction mechanism of the motor Mo; a driven gear 2 meshing with the gear 1; a cam $2_1$ for film footage fixedly mounted on the gear 2; a gear 3 affixed to the gear 2 in coaxial relation; a sprocket drive gear 4 meshing with the gear 3; a sprocket shaft 5; a key bar 6 inserted into the sprocket shaft 5; and a sprocket 7. It is noted that the bottom end $5_1$ of the sprocket shaft 5 protrudes from the bottom panel of the camera housing to serve as a rewind control button to disengage the key bar 6 from a detent groove in the sprocket upon upward depression of the button, so that the sprocket 7 is rendered freely rotatable. The gear 4 is of a predetermined width. Positioned adjacent the top end of the shaft 5 is a switch comprising two contacts 46 and 47 to be described later. A gear 9 meshes with the gear 4 at the lower half portion thereof when in the winding up mode; and a driven gear 10 affixed to the top end of a rotary shaft 10a drives a take-up spool 13, and always meshes with the gear 9. The shaft 10a and the spool 13 are connected to each other through a friction clutch as is known in the art, so that when the gear 10 is driven to rotate, the film is wound up on the spool 13. A gear 11 is rotatably driven by the gear 3 meshing with the gear 4. Fixedly mounted on said gear is a charge cam 12 cooperative with a cam follower pin 14a on a lever 14 upon rotation to pivot the lever 14 about a shaft 14c, while the free end 14b of the lever 14 acts on a shutter charging mechanism to be described later. A wind-up detecting lever 16 is pivoted at a shaft 15 and biased by a spring 16a in a counterclockwise direction with a projected portion 16b thereof when dropped into a recessed portion of the cam disc $2_1$ causing the lever 16 to change over a switch 43-45 to be described later. Gears 17-20 form a train for transmitting torque of the motor Mo to a rewinding forked portion 20A when in the rewinding mode as the gear 4 is brought into engagement with the gear 17 by pushing the rewind control button $5_1$.

A rewind mode changeover button 22 upon depression in a direction indicated by arrow C to moves a contact 49, thereby the contact relation with the contacts 48 and 50 is changed over. A flash device 23 is incorporated within the camera housing and has a xenon tube 24 connected to a firing circuit to be described later. A mount for the flash device 23 is biased by a spring 23a to move upwards. When the pop-up button 27 is depressed, a lever is turned to disengage its pawl from a projected portion 23b of a slide, thereby the flash device 23 is moved upward from the interior of the camera housing to be set in an operative position. Contacts 51-53 form a switch cooperative with the projected portion 23b.

FIG. 2 also shows a release button T; a switch S1 arranged to be closed by one end of the release button T; a normally closed switch 54-55 arranged to be opened by a stepped-down portion of the release button T; a shutter latching lever 28 responsive to the release button T to be disengaged from a shutter drive lever 29 against the force of a spring 59; shutter blades 30,31 each having shutter openings 01 and 02 configured to a wedge in a portion so that they also serve as a half open type shutter. The drive lever 29 is connected to a spring 35 for opening the shutter, and fixedly carries pins 29a and 29b for connection with respective ends of the shutter blades 30 and 31 in pivotal relation. When the drive lever 29 is turned in a clockwise direction about a shaft 32, the shutter blades 30 and 31 are moved to the right and left respectively, causing their openings 01 and 02 to approach each other with the resultant effective opening size being determined by the amount of relative movement thereof. A shutter return control slide 37 has a lug 37a at one end thereof engaged with a pawl 40b of an armature 40 of an electromagnet 41, so that a spring 39 is tensioned. Pins 38 are engaged in respective longitudinally elongated slots in the slide 37. It is noted that the slide 37 has a projected portion 37b arranged upon leftward movement to close the shutter by engagement with the side of the lever 29, and has a bentoff portion 37d arranged to turn the wind-up detecting lever 16 in a clockwise direction by engagement with the end 16a thereof, thereby the switch 44-45 is forcibly closed in the shutter closed state (where the charging is not yet completed). Another bent portion 37e at the rear end of the slide 37 while engaging with the end 14b of the charge lever 14 is moved to the right, thereby the spring 39 is recharged.

Figure 3:
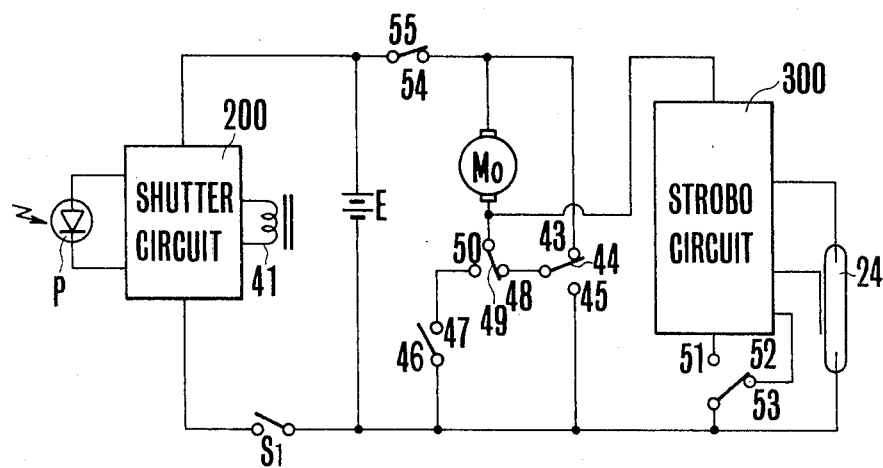
FIG. 3 is an electrical circuit diagram of the camera of FIG. 1.

FIG. 3 shows an electrical circuit used in the camera as shown in FIG. 2. The figure includes an electrical power source or battery E; and a shutter control circuit 200 connected through a switch S1 to the battery E and controlling the operation of an electromagnet 41. A photo-sensitive element P such as a silicon photo-diode or the like is connected across the inputs of the circuit 200. Connected between the battery E and the motor Mo is the switch 54-55 which is opened by depressing the above-described release button. Connected in series to the switch 54-55 are the switch 48-50 cooperative with the mode changeover button 22 and the switch 43-45 cooperative with the detecting lever 16 for the footage. A firing circuit 300 for the xenon tube 24 is connected to the positive terminal of the battery E through the switches 43-44, 48-49 and 54-55 and to the negative terminal through the switch 51-53. It is noted that the firing circuit 300 is associated with booster means including a DC-DC converter and the storage capacitor. The shutter control circuit 200 when in the daylight mode controls the period of energization of the electromagnet 41 in accordance with the output of the photo-sensitive element P, and, when in the flash mode, controls the time interval from the closure of the count switch 56-57 by the shutter blade 30 to the initiation of energization of the electromagnet 41 in accordance with the resistance value of a variable resistor depending upon the distance from the camera to an object being photographed. Since these circuits are well known in the art, the details of them are no longer described.

The operation of the camera of FIGS. 1 to 3 is as follows:

(1) Daylight mode:

After the camera is aligned with an object, the operator will depress the release button T from the charged position through a first stroke distance, thereby the switch 54-55 is opened and the switch S1 is closed. As a result, the power supply to the motor Mo is cut off.

Since, at this time, the switch 51-53 is open, the firing circuit 300 is maintained de-actuated.

Upon further depression of button T through a second stroke distance lever 29 is released from the latching connection by the release button T, and then is turned about the shaft 32 in the clockwise direction under the action of the spring 35 while simultaneously driving the shutter blades 30 and 31 to move with reference to each other. As the openings 01 and 02 gradually overlap each other, an image of the object is formed by the lens 36 on the film F to initiate an exposure. In a time interval dependent upon the object brightness, the electromagnet 41 is energized to attract the armature 40 against the force of the spring 60, thereby the slide 37 is disengaged from the pawl 40b. Then, the slide 37 is driven to move to the left by the force of the spring 39. At a time during this movement, the projected portion 37b strikes the lever 29 at the side edge thereof and then turns the latter in the counterclockwise direction until the shutter blades 30 and 31 close the shutter opening. Since, up to this time, the release button T is left depressed, energization of the motor Mo does not occur. After that, when the operator removes his finger from the button T, the switch S1 is opened to cut off the power supply to the shutter control circuit 200, and the switch 54-55 is closed to supply the motor Mo with electrical energy from the battery E through a circuit which can be traced as: E-switch 54-55-motor Mo-switch 48-49-switch 44-45-E. Thus, the motor Mo starts to rotate.

Motion of the motor is transmitted through the gears 1-4 to the sprocket 7, causing the film F to be advanced as the sprocket 7 engages in perforations of the film F. During this time, the gear 11 is also driven to rotate along with the cam disc 12, causing the lever 14 to be turned through the follower pin 14a and cam connection. Such movement of the lever 14 causes rightward movement of the slide 37 in engagement at its upward rise 37e with the end 14b of the lever 14 to tension the spring 39.

When the shutter is reset with the slide 37 being engaged again with the pawl armature 40, as the bent-off portion 37d is moved away from the lever 16, the projected portion 16b of the lever 16 is brought into abutting engagement against the outer periphery of the cam $2_1$ so that the switch 44-45 remains open to continue energization of the motor Mo. In one revolution of the gear 2, the film F is advanced through the length of one frame, while the take-up spool 13 is simultaneously driven to wind up the advanced film. The projection 16b of the lever 16 is aligned with the cutout of the cam $2_1$ and drops into the cutout, as the lever 16 is turned in the counterclockwise direction by the force of the spring 16a. Such movement of the lever 16 causes opening of the switch 44-45 and then causes closure of the switch 44-43.

As a result, the motor Mo is short-circuited through the switches 48-49 and 43-44, and is stopped rapidly under an induced braking action. Thus, one cycle of film winding and shutter charging operation has been completed and the camera is made ready for the next exposure.

(2) Flash Exposure Mode:

When the pop-up button 27 is depressed, the flash device 23 is moved to the operative position by the action of the spring 23a, and the switch 51-52 is closed.

In a similar manner to that described in connection with the daylight exposure mode (1), the depression of the release button T initiates the power supply to the shutter control circuit 200 by the switch S1 and maintains the de-energization of the motor Mo and the flash firing circuit 300 by the switch 54-55. Then, the shutter is opened and closed to effect an exposure. After that, by releasing the button T from depression, the switch S1 is opened, and the switch 54-55 is closed, thereby the same closed circuit as described above is established to start energization of the motor Mo. During the winding operation, the switch 43-44 remains open so that the firing circuit 300 is not supplied with electrical energy. In the next stage where the winding operation is completed and the switch 43-44 is closed to establish the short-circuit of the motor Mo, a power supply circuit which can be traced from the positive terminal of the battery E through the switch 54-55, closed-switch 44 in 43 position-switch 49 in 48 position to the positive input of the firing circuit 300 and from the negative input thereof through the switch 52 in 51 position to the negative terminal of the battery E is established to start charging of the storage capacitor. Whether or not the charging is completed can be indicated to the photographer by arranging an indicator such as a neon tube in the finder optical system 58 as is known in the art.

After the voltage on the storage capacitor has reached a satisfactory operating level, the photographer may depress the release button T again, thereby the motor Mo and the firing circuit 300 are inhibited from electrical power supply.

Therefore, during the time when the shutter control circuit 200 is under operation, the battery E does not supply its energy to any of the circuit portions except that circuit.

It is to be understood from the above that the power supply from the battery E is directed to the shutter control circuit in synchronism with the actuation of release, then to the motor Mo for performing the winding operation in synchronism with a termination of the actuation of release, and then, after the completion of the winding operation, to the firing circuit, so that no large current flows out from the battery E at any given time.

(3) Rewinding Mode:

To effect the rewinding operation as with the ordinary camera, the photographer will first depress the rewind control button $5_1$ to disengage the key 6 from the detent groove in the sprocket 7. By the upward movement of the button $5_1$, the gear 4 is taken out of the meshing engagement with the gear 9, and is then brought into driving engagement with the gear 17. Such movement also causes the switch 46-47 to be closed by the top end of the shaft 5. Then, when the button 22 is depressed to close the switch 49-50, a closed circuit: battery E-motor Mo-switch 49-50-switch 46-47-battery E, is established so that the motor Mo starts to rotate. Motion of the motor Mo is transmitted through the gear train 17-20 to the forked portion 20A engaging the supply spool within the film magazine. As a result, the film is transported backwards to effect rewinding of the film. In order to prevent the leading end of the film from entering the magazine, provision may be made for detecting stoppage of rotation of the sprocket 7 and for stopping the motor Mo from further rotation. Such supplementary means has no direct concern with the present invention and, therefore, its description is omitted.

Until the button 22 is released from the force depressing it, the switch 48-49 remains open to cut off the power supply to the firing circuit 300. On the other hand, the shutter control circuit 200 is also rendered inoperative because of the opening of the switch S1. Although the firing circuit 300 is connected through the motor Mo to the battery, the power supply to the firing circuit 300 does not substantially occur because the motor load is connected in series to limit the current with which the storage capacitor is charged to a small value. After the rewinding operation is completed, when the switch 48-49 is closed, the power supply to the firing circuit 300 again starts.

Within the time necessary to exchange the film magazine with a new one, therefore, the power supply to the firing circuit 300 goes on. Before the new film is loaded, the charging of the same circuit will be terminated to make the camera ready for the next exposure. Further, during the rewinding operation, the torque transmission system to the take-up spool is broken. As a result, the spool 13 is put into free rotation in unison with the shaft 10a, and the friction between them does not form part of the load on the motor Mo. All the output of the motor Mo can be used in driving the rewinding mechanism of which the inertia is very small. Therefore, even by the use of a battery of small capacity, it is made possible to achieve high speed rewinding operation. Since the rewinding load is small as compared with the winding load, it is also possible for the remaining electrical energy in the battery, however small it is, if the preceding winding operation has been possible, to accomplish the rewinding of the full length of the film in one magazine, and therefore to prevent an accident such as unintentional interruption of rewinding from occurring.

As has been described in detail, the present invention has the advantage of providing a camera which endures long time use, since the battery is always protected from the drawing of an extremely large current at any given time by controlling the distribution of energy in such a manner that the exposure control circuit is supplied with electrical energy at the time of actuation of the camera, while simultaneously permitting the other supplementary circuits such as the rewinding control circuit and flash firing circuit to be disconnected from the common battery the other hand, after the exposure has been completed, the battery is substantially connected only to the motor and is then, upon completion of the winding operation, switched to the firing circuit.

Further, since such coordinated control of the power supply is assured by the various switches, each of which is actuated at a time at which a corresponding operation completes itself, that is, the release switch, the exposure determining switch and the winding-up completion switch, the reliability of the operation of the various circuit portions can be improved, and the construction and arrangement can be made relatively simple.

As a result, a further addition of other battery-fed circuits such as a date printing circuit and a display circuit to the above-described supplementary circuits such as the winding control circuit and flash firing circuit, allows the provision of a camera which can be fully used for a long time.

Though the above embodiment has been described in connection with a half open type shutter control circuit, a shutter preselection diaphragm control circuit may be substituted therefor, and it is to be understood that the above-described exposure control circuit is not always so complicated as to derive an exposure value according to the object brightness or the object distance, but may be simply in the form of an actuator for the exposure determining means such as the shutter, or the diaphragm, for example, a magnet release circuit.

As the switch means, shown in the form of contacts, use may be made not only of mechanically operated switches, but also of switching devices sensitive to an electrical or magnetic signal from the camera release member, or the exposure determining means, provided that an equivalent result is effected.

It is further noted that the above-described embodiment even when in the rewinding mode allows for electrical power supply to the stroboscopic lamp firing circuit, but the motor winding connected in the power supply path to the firing circuit serves as a large load to substantially inhibit the power supply. Therefore, there is no possibility of a large amount of current flowing out from the battery at one time so that the battery will not suffer from accelerated loss in usefulness.

The term "substantially inhibit the power supply" herein used means that even though the battery is not perfectly shielded from the stroboscopic lamp firing circuit, the resultant leakage current from the battery does not lead to the rapid consumption of electrical energy of the battery.

It is noted again that the switch associated with the release button in the above-described embodiment may be otherwise arranged such as between the power supply paths to the motor and the stroboscopic lamp firing circuit. In this case, the motor is rendered operative by the signal occurring when the exposure has been completed, and then inoperative when the winding operation has been completed, and the termination of energization of the motor is coincident with the initiation of power supply to the stroboscopic lamp circuit. For this purpose, it is required for the photographer to continue the depression of the release button during the power supply to the firing circuit. To save the labor of the photographer, provision may be made for locking the release button in the depressed position until the locking is automatically released in response to the signal occurring when the storage capacitor is fully charged.

Figure 5:
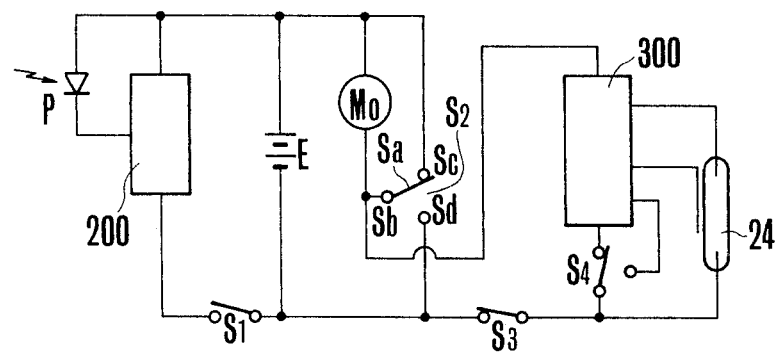
FIG. 5 is an electrical circuit diagram of the camera of FIG. 4.
Figure 4:
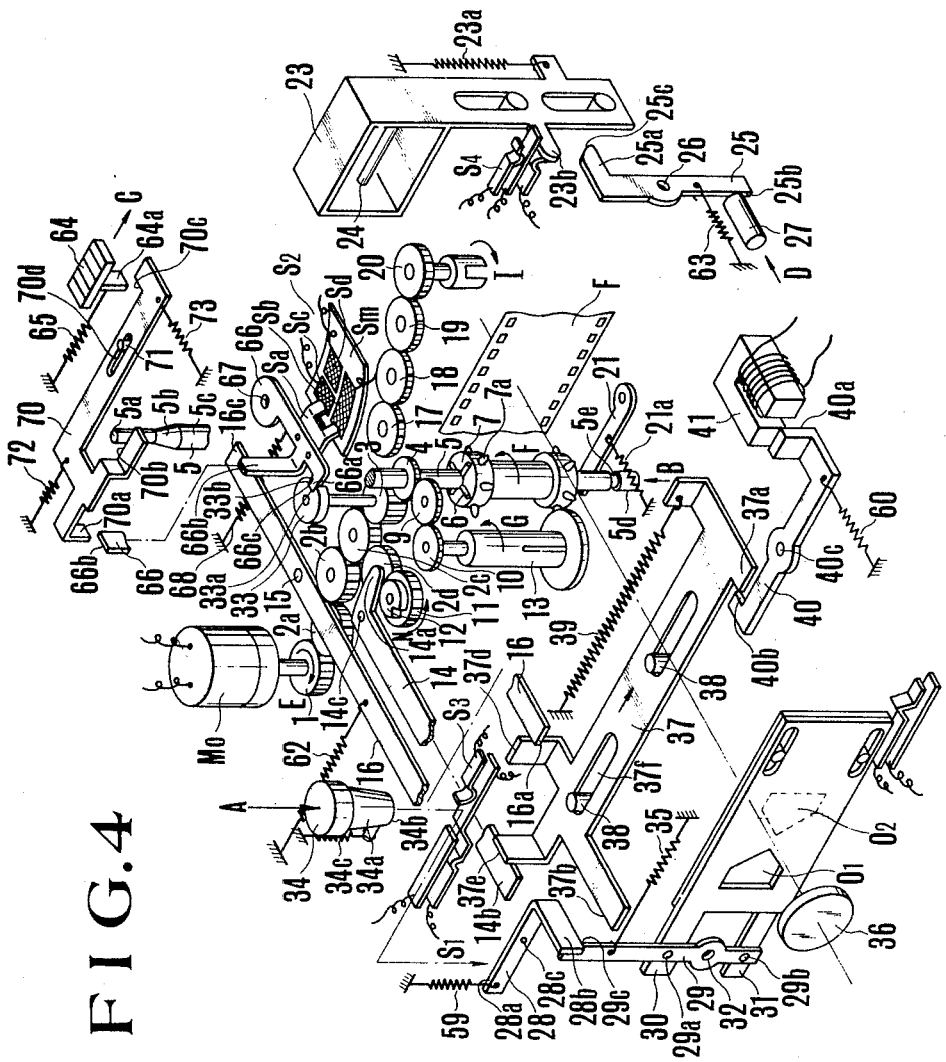
FIG. 4 is an exploded perspective view of the main parts of another embodiment of a motor driven camera according to the present invention.

FIGS. 4 and 5 show another embodiment of the present invention. In the foregoing embodiment, the switch associated with the winding and shutter cocking mechanism and the switch associated with the rewinding control mechanism are provided separately from each other, and the start switch for rewinding operation is provided in addition thereto, thus the total number of switches is large. Such switches are made of relatively expensive materials, and their incorporation into the camera necessitates a great number of production steps, with the resultant production cost of the camera being increased.

In this embodiment, a single switch is arranged to cooperate with the winding mechanism, the shutter mechanism and the rewinding preparation mechanism.

FIG. 4 is a similar view to that of FIG. 2, and FIG. 5 is an electrical circuit diagram, where the same reference characters have been employed to denote the similar parts to those shown in the first embodiment. FIG. 4 shows a similar electric motor Mo for winding and rewinding film to that described before: a gear 1 affixed to the output shaft of the motor Mo; gears 2a, 2b, 2c and 3 forming a drive gear train; a sprocket gear 4 affixed to a shaft 5 of a sprocket 7; a pin 6 radially extending from the shaft 5 and fitted in a clutch groove 7a provided in the upper surface of the sprocket 7; an intermediate gear 9; a spool gear 10; and a film take-up spool 13. An intermediate gear 2d meshes with the gear 2c; a gear 11 charges the shutter with a cam disc 12 fixedly mounted on the upper surface thereof; and a charge lever 14 is pivoted at a shaft 15 and has an arm 14a for engagement with said cam disc 12 and an arm 14b for engagement with a shutter mechanism.

Gears 17, 18 and 19 form a rewind gear train; provided with a rewind fork as is known in the art. The gear 17 is shown as disengaged from the sprocket gear 4 in the wound position where the torque of the motor Mo is not transmitted to the rewind gear 20. The bottom end of the sprocket shaft 5 extends outwardly of the bottom panel of the camera housing to serve as a rewind control button. When pushed in a direction indicated by arrow B, the above-described pin 6 is detached from the clutch groove to break the driving connection of the gear train to the sprocket 7, and at the same time the gear 4 changes its engagement from the gear 9 to the gear 17 while being unchanged from engagement with the gear 3, thereby the camera is switched from the wind to the rewind mode. A detent lever 21 is arranged to engage in a groove 5e when the sprocket shaft 5 is pushed upward, so that the sprocket shaft 5 is held in the depressed position; and a spring 21a urges the lever 21 to engage the sprocket shaft 5. The gear 3 fixedly carries a wind stop disc 33.

A wind-up detection lever 66 has a pawl 66a arranged to engage in a cutout 33a of the wind stop disc 33 and pivot on a shaft 67. A spring 68 urges the lever 66 to normally engage at its pawl against the outer periphery of the disc 33. As the sprocket 7 is rotated one revolution by the motor Mo through the drive gear train to advance the film one frame, and the charge cam disc 12 is rotated one revolution to charge the shutter, the gear 3 is also rotated one revolution with the resultant drop of the pawl of the lever 66 in the cutout 33a of the wind-up disc. Thus, the completion of one cycle of winding operation is detected. Fixedly mounted on the detection lever 66 through an insulator is a movable contact Sa of a changeover switch S2 constituting part of the circuit of FIG. 5 so that as the lever 66 is turned, the movable contact Sa slidingly moves on a switch substrate Sm. On the switch substrate Sm there are arranged fixed contacts Sb, Sc and Sd. Upon engagement of the lever pawl 66a against the outer periphery of the disc 33, the movable contact Sa bears against the fixed contacts Sb and Sd so that the battery E is connected to the motor Mo, and upon detection of the completion of winding operation, the contact Sa bear against the fixed contacts Sb and Sc so that the both poles of the motor Mo are short-circuited.

Shutter blades 30,31 each have wedge shaped openings 01 and 02, the blades 30,31 cooperating with a common lever 29 through respective pins 29a and 29b in such a manner that when the lever is turned about a shaft 32 in a clockwise direction, the shutter blades 30 and 31 are slidingly moved in opposite directions to each other to effect an opening, and when the lever 29 is turned in a counterclockwise direction, the shutter is closed. A spring 35 urges the lever 29 to open the shutter blades; and a latching lever 28 retains the shutter control lever 29 in the closed position, lever 28 being pivoted at a shaft 28c and urged by a spring 59 to engage at its bent portion 28b with the cutout portion 29c of the lever 29. A shutter closing member 37 has an arm 37b for engagement with the control lever 29 and supported in the camera housing so as to slidingly move in parallel with the shutter blades as it is guided by pins 38 engaging respective slots 37f in the member 37. An arm 37e engages with the above-described charge lever 14. When in winding, the lever 14 is turned in the counterclockwise direction by the charge cam 12, the slide 37 is pushed by the end 14b in a direction indicated by an arrow, while the spring 39 is being charged, until the arm 37a is engaged with the end 40b of the latching lever 40.

The latching lever 40 is pivoted at a shaft 40c and is biased in a clockwise direction by a spring 60. An electromagnet 41 in the shutter circuit, upon energization attracts the latching lever at the rear end 40a, thereby the latching lever is turned against the force of the spring 60 to actuate the closing member 37.

An arm 37d cooperates with the above-described detection lever 66 through an intermediate lever 16, and the intermediate lever 16b is pivoted at a shaft 15 and always urged by a spring 62 to engage at one end 16a thereof with the arm 37d, the other arm 16c of which is engaged with an upward extension 66b of the detection lever 16 to transmit the shutter closing movement to the detection lever. A shutter release button 34 is provided above the above-described latching lever 28 and has an upward return force applied thereto by a spring 34c. A power supply control switch S1 is provided for the shutter circuit; and a normally closed switch S3 is provided for controlling the power supply to the stroboscopic lamp firing circuit provided underneath the release button.

A stroboscope 23 is slidingly movably incorporated within the camera housing with the casing having a flash tube 24, and is urged upwardly by a spring 23a so that when a pop-up button 27 is pushed in a direction indicated by arrow D, a latching lever 25 is turned against the spring 63 to disengage at its pawl 25a from a projection 23b of the casing, thereby the stroboscope is moved upwards from the normally retracted position to an operative position under the action of the spring 23a. A switch S4 is positioned adjacent the projection 23b. 64 is a knob for starting rewinding operation with its head exposed over the camera housing. Underneath the knob 64 there is a member 70 having a slot 70d engaged with a pin 71 so that the member 70 is slidable and pivotal in cooperation with the sprocket shaft 5 and the detection lever 66. The sprocket shaft 5 is provided at its upper portion with a small diameter 5a and a tapered portion 5b. The rewind lever 70 is normally stopped in engagement at its arm 70b with the small diameter 5a under the action of springs 72 and 73. When the sprocket shaft is pushed upward to effect changeover to the rewinding mode, the arm 70b is pushed by the tapered portion 5b causing the member 70 to turn in a counterclockwise direction to a position where a bent-off arm 70a is engageable with the upward extension 66b of the detection lever 66. In this state, when the knob 64 is moved in a direction indicated by arrow C against the spring 65, its leg 64a engages the projection 70c and moves the lever 70 in the same direction, thereby the detection lever 66 is turned about the shaft 67 against the spring 68 in engagement at its bent arm 70a with the upward extension 66b. Such movement also causes the movable contact Sa to connect the fixed contacts Sb and Sd to each other so that the motor Mo starts to rotate.

FIG. 5 shows the electrical circuit of the FIG. 4 embodiment. E is an electrical power source or battery; 200 is a shutter control circuit applied with electrical power through a switch S1; P is a photo-sensitive element such as silicon photo-diode connected to an input of the control circuit 200. Between the motor Mo and the battery E there is provided the above-described changeover switch S2. When the switch S2 is set with the contact Sa connecting the fixed contacts Sb and Sd, the motor Mo is energized. When the contact Sa connects the contacts Sb and Sc, the both poles of the motor Mo are short-circuited. A stroboscopic lamp firing circuit 300 is connected to the battery E through the contacts Sb and Sc of the above-described changeover switch S2 and a switch S4, so that only when the motor Mo is de-energized, the power supply is established. The stroboscopic lamp firing circuit 300 is of construction known in the art, including voltage boosting means or DC-DC converter, main condenser and the like. The shutter control circuit 200 is also of construction known in the art, controlling energization of an electromagnet in response to the output of the photo-sensitive element P.

The operation of the camera of FIGS. 4 and 5 is as follows:

The camera mechanism of FIG. 4 is assumed to be in the wound position and the stroboscope in the operative position where the charging of the main condenser is completed. When the release button is depressed in a direction indicated by arrow A, the switch S3 is first opened as it is pushed by the bottom 34b of the button, thereby the power supply to the stroboscope is cut off. Then, the switch S1 is successively closed to initiate power supply to the shutter control circuit. Upon further depression, the release button 34 strikes the latching lever 28 at the arm 28a, releasing the control lever 29 from latching connection. Then, the control lever 29 is turned about the shaft 32 in the clockwise direction by the force of the spring 35. By this, relative movement of the shutter blades 30 and 31 occurs with the openings 01 and 02 gradually overlapping each other to permit light from the object being photographed to enter through the objective lens 36 to form an image of the object on the film F. Thus, an exposure is initiated. In a time interval dependent upon the object brightness lever, the electromagnet 41 is energized to attract the armature 40a against the force of spring 60, thereby the lever 40 is disengaged from the shutter closing member 37. At this time, an X-contact (not shown) is closed to trigger the stroboscopic lamp 24. Then, the closing member 37 is moved by the force of the spring 39 in the opposite direction to the arrow, the arm 37b pushing the side edge of the lever 29 against the force of the spring 35, thereby the shutter is closed to terminate the exposure.

The above-described intermediate lever 16 engaging the arm 37d of the slide member 37 follows the member 37 under the action of the spring 62, but, before the slide member 37 is stopped at the terminal end of movement thereof, the lever 16 abuts against the side surface 34a of the release button, thereby the opposite end 16c is held out of engagement with the detection lever 66.

When the release button is released from the force depressing it, the latching lever 28 is first actuated to latch the control lever 29. Then, the switch S1 is opened and the switch S3 is closed. Then, the intermediate lever 16 is released. Then, the lever 16 is turned in the clockwise direction under the action of the spring 62, the other end 16c turning the detection lever 66 to disengage its end 66a from the wind disc 33. At the same time, the movable contact Sa of the switch S2 is changed over from Sb-Sc to Sb-Sd position where the motor Mo is energized.

It will be appreciated that since the initiation of energization of the motor is deferred pending the completion of returning movement of the shutter release button at which time the shutter blades are latched, an accident such as opening of the shutter at a time during the winding operation does not occur.

Though the motor Mo when in operation is supplied with electrical power through the closed circuit: battery (+)-Mo-firing circuit-S4-Battery (−), the motor Mo drops the potential to the ground level so that the stroboscope is not charged. Motion of the motor Mo in the direction of arrow E is transmitted through the gear train to rotate the sprocket 7 and spool 13 in directions of arrows F and G respectively, thereby the film is taken up by the spool 13, and the charge cam 12 on the gear 11 is also rotated in the direction of arrow H. One revolution of the cam 12 causes the lever 14 to reciprocate as it is pivoted about the shaft 14c. During the first half cycle of reciprocation of the lever 14, the closing member 37 is pushed by the arm 14b in the direction of the arrow, and then latched by the latching lever 40 in a state where the spring 39 is charged. The detection lever 66 remains in contact with the circumferential surface of the disc 33 during the winding operation, holding the switch S2 in the power supply state. When the film is advanced one frame for one revolution of the disc 33, the detection lever is turned by the action of the spring 68 as its end drops into the cutout portion 33a, thereby the switch S2 is moved to Sb-Sc position where the power supply is cut off and the motor Mo is short-circuited to effect braking action thereon. After the pawl of the detection lever drops into the cutout portion 33a, its side edge 66a abuts on the shoulder 33b of the cutout portion so that the winding mechanism gets stopped always in a predetermined position. Such movement of the switch S2 establishes the circuit: Battery(+)-Sc-Sa-Sb-Firing Circuit-S4-S3 Battery E(−) to charge the main condenser. Thus, the camera is reset to the initial state.

Upon depression of the shutter release button again, the above-described procedure repeats itself to make the next exposure. If a daylight exposure is desired, the stroboscope casing is pushed down and held in the retracted position by the lever 25 so that the switch S4 is opened and the charging does not occur even after the winding operation is completed.

Next to rewind the film, button operator will push the 5d in the direction of arrow B and move the sprocket shaft 5 upward, thereby the rewind lever 70 is pivoted by the tapered shaft portion 5b acting on the arm 70b. At the same time when the bent part 70a is engaged with the upward extension 66b of the detection lever 66, the pin 6 is moved away from the clutch groove 7a of the sprocket 7, and the sprocket is freed. Then, the gear 4 is taken out of meshing engagement with the gear 9 and brought into meshing engagement with a gear 17.

Then, when the knob 64 is pulled to the direction of arrow C, the leg 64a engages the projection 70c and displaces the rewind lever 70 in the same direction. Such movement causes the detection lever to turn in the counterclockwise direction, which in turn causes the switch S2 to move to the Sb-Sc position. Then the motor Mo starts to rotate in the direction of arrow E likewise as in the wind-up mode. Motion of the motor Mo is transmitted through the gear train to rotate the rewind gear 20 in the direction of arrow I, thereby the film is transported backward from the take-up spool 13, while being convoluted on the supply spool (not shown). Since the sprocket and take-up spool are taken out of connection to the gear train, they rotate freely. During the time when the knob 64 is held in the pulled position by the operator's finger, the detection lever 66 remains engaged with the lever 70 to hold the power supply by the switch S2. Thus, the motor Mo continues to rotate. When the finger is removed from the knob 64, the knob 64 and the lever 70 are returned by the action of respective springs 65 and 72, and the detection lever 66 is also returned under the action of the spring 68 to change over the switch S2 to the position where the motor Mo is de-energized. To return the sprocket shaft 5, the latching lever 21 is turned by a manually operable button (not shown), or in automatic response to the winding mechanism, to permit the shaft 5 to move downward under the action of a spring (not shown).

In the above-described embodiment, the actuation of the motor for rewinding operation is controlled by a member which is separate from the rewind control button, so that even when the knob 64 is accidentally operated at a time during the exposure operation, the film is protected from rewinding. It is, however, possible for the changeover to the rewinding state and the initiation of the rewinding operation to be simultaneously effected by one touch, provided that some safety device is also used in a suitable manner.

This embodiment is, as has been mentioned above, to control the operation of the switch in the motor control circuit by means of a member arranged to detect the completion of the winding operation and the completion of the shutter operation. When in the rewind mode, the detection member is rendered operative with the changeover member for the rewinding operation. Thus, the required number of switch elements is substantially reduced as compared with conventional arrangements, thereby providing an additional advantage that the assembly and adjustment of the components are simplified to reduce production costs. Another advantage is that since the electrical power sources for the motor and the stroboscope are in common, the number of contacts is reduced to prevent delay of re-cycle time of the stroboscope due to poor contact quality and the like.

What is claimed is:

1. A motor driven camera including:
   a shutter mechanism;
   a winding mechanism for transporting a film and for charging a shutter;
   a flash device;
   an electric motor for driving said winding mechanism;
   an electrical power source for supplying electrical energy to said motor and said flash device;
   means for detecting the completion of a film winding operation;
   shutter release means;
   a first switch cooperative with said release means for interrupting the supply of electrical energy to said flash device during the time when the shutter is in operation;
   a second switch cooperative with said detecting means for interrupting the supply of electrical energy to said flash device during the time when said motor is supplied with electrical energy, and for supplying electrical energy to said flash device when the completion of the film winding operation is detected by said detecting means;
   a film rewinding mechanism;
   changeover means for activating said film rewinding mechanism; and
   a rewind control switch connected in series to said second switch and arranged to be closed in response to said changeover means.

2. A motor driven camera according to claim 1, wherein the rewinding mechanism includes a rewinding button which closes and opens a switch connected in series to the motor and the rewind control switch.

3. A motor driven camera including:
   a shutter;
   release means actuatable from a first condition to a second condition and restorable to the first condition for starting a camera operation including a shutter operation in response to the release means being actuated from the first condition to the second condition;
   film winding means for producing a film winding operation;
   an electric drive motor for operating the film winding means after a shutter operation and in response to said release means;
   a flash device;
   supply means for supplying electrical energy to said motor and supplying energizing power to said said flash device;
   a first switch cooperating with actuation of the release means to prevent the supply of power from the supply means to the flash device during a shutter operation;
   a second switch for correlating the prevention of the supply of power to the motor for the preparation of a supply of power to the flash device, and for permitting a supply of power to the flash device only when the film winding operation is completed and the release member is resored to the first condition.

4. A motor driven camera according to claim 3, wherein the shutter includes opening means and closing means, the winding means includes means for detecting the completion of a winding operation, and the second switch is switched by the shutter closing means and the means for detecting wind-up completion.

5. A motor driven camera including:
   a winding mechanism for transporting a film and for energizing a shutter;
   a film rewinding mechanism;
   a flash device;
   an electric motor for driving said winding mechanism and said film rewinding mechanism;
   an electrical power source for supplying electrical energy to said motor and said flash device;
   release means for actuating said shutter;
   selector means for switching the driving force of the motor either to actuate the winding mechanism or to operate the film rewinding mechanism;
   a first switch associated with the release means to permit supply of power to the motor and the flash device when the shutter is non-operative;
   a second switch associated with the winding mechanism to supply power to the motor or to supply power to the flash device; and
   a third switch separate from the second switch and associated with the selector means to form a power supply path to the motor so as to drive the film rewinding mechanism, said third switch being connected in series with the first switch and the motor.

* * * * *